(12) United States Patent
Cheng et al.

(10) Patent No.: US 11,382,076 B2
(45) Date of Patent: Jul. 5, 2022

(54) PHYSICAL UPLINK CONTROL CHANNEL REPETITION IN NEXT GENERATION WIRELESS NETWORKS

(71) Applicant: FG Innovation Company Limited, Tuen Mun (CN)

(72) Inventors: Yu-Hsin Cheng, Hsinchu (TW); Tsung-Hua Tsai, Hsinchu (TW); Wan-Chen Lin, Hualien (TW)

(73) Assignee: FG Innovation Company Limited, Tuen Mun (HK)

( * ) Notice: Subject to any disclaimer, the term of this patent is extended or adjusted under 35 U.S.C. 154(b) by 197 days.

(21) Appl. No.: 16/725,882

(22) Filed: Dec. 23, 2019

(65) Prior Publication Data

US 2020/0205150 A1 Jun. 25, 2020

Related U.S. Application Data

(60) Provisional application No. 62/784,548, filed on Dec. 24, 2018.

(51) Int. Cl.
*H04W 72/04* (2009.01)
*H04L 1/18* (2006.01)
*H04L 5/00* (2006.01)

(52) U.S. Cl.
CPC ....... *H04W 72/0413* (2013.01); *H04L 1/1812* (2013.01); *H04L 5/0055* (2013.01); *H04W 72/042* (2013.01); *H04W 72/0446* (2013.01)

(58) Field of Classification Search
CPC ........... H04W 72/0413; H04W 72/042; H04W 72/0446; H04W 72/048; H04W 72/044; H04W 72/0493; H04W 72/046; H04W 52/242; H04W 76/27; H04L 5/0032; H04L 5/0051; H04L 25/0226; H04L 5/0023; H04L 1/1896; H04L 1/1861; H04L 1/1858; H04B 7/0404; H04B 7/0691; H04B 7/022; H04B 7/0626
See application file for complete search history.

(56) References Cited

U.S. PATENT DOCUMENTS

| | | | |
|---|---|---|---|
| 10,708,866 B2 * | 7/2020 | Papasakellariou | .. H04W 52/325 |
| 10,764,896 B2 * | 9/2020 | Guo | ..... H04B 7/0695 |
| 10,873,966 B2 * | 12/2020 | Papasakellariou | ........................... H04W 72/1289 |
| 11,026,226 B2 * | 6/2021 | Yang | ..... H04L 5/0035 |
| 2018/0331728 A1 * | 11/2018 | Tsai | ..... H04B 7/0617 |
| 2019/0045552 A1 * | 2/2019 | Blankenship | ............. H04L 1/08 |

(Continued)

*Primary Examiner* — Hanh N Nguyen
(74) *Attorney, Agent, or Firm* — ScienBiziP, P.C.

(57) ABSTRACT

Some of the present implementations provide a method for a user equipment (UE) for performing a physical uplink control channel (PUCCH) repetition. The method may include receiving, from a base station, a physical downlink control channel (PDCCH) comprising downlink control information (DCI) in a control resource set (CORESET). The method then determines a spatial domain filter for a PUCCH transmission based on an index associated with the CORESET. After determining the spatial domain filter, the method may transmit, to the base station, a PUCCH in a slot using the spatial domain filter, and transmit, to the base station, a repeat of the PUCCH in one of the same slot, or a different slot, using the spatial domain filter.

4 Claims, 6 Drawing Sheets

(56) References Cited

U.S. PATENT DOCUMENTS

2019/0149379 A1\* 5/2019 Xiong ................... H04L 5/0035
370/329
2020/0145169 A1\* 5/2020 Zhou ...................... H04B 1/713

\* cited by examiner

PHYSICAL UPLINK CONTROL CHANNEL REPETITION IN NEXT GENERATION WIRELESS NETWORKS

CROSS-REFERENCE TO RELATED APPLICATION(S)

The present application claims the benefit of and priority to a provisional U.S. Patent Application Ser. No. 62/784,548, filed on Dec. 24, 2018, entitled "Method and Apparatus for high reliability PUCCH Enhancement." The disclosure of the application is hereby incorporated fully by reference into the present application.

FIELD

The present disclosure generally relates to wireless communications, and more particularly, to enhancing Physical Uplink Control Channel (PUCCH) transmission for Ultra-Reliable Low-Latency Communication (URLLC) services in next generation wireless networks.

BACKGROUND

In New Radio, a physical uplink control channel (PUCCH) is an uplink physical channel that carries uplink control information (UCI). As downlink control information (DCI) is carried by physical downlink control channel (PDCCH), UCI is carried by the PUCCH. Also in NR, a repetition is a method in which a transmitter (e.g., a user equipment (UE)) transmits a message (e.g., an acknowledgement (or ACK) message) multiple times (e.g., to ensure that the receiver (e.g., a base station) receives the message). Currently, a PUCCH repetition is inter-slot. That is, each repetition of a PUCCH is carried on a different slot. Additionally, the PUCCH repetition applies only to a single PUCCH format (e.g., a long PUCCH, such as PUCCH format 1, PUCCH format 3, and PUCCH format 4). Therefore, the PUCCH repetition, as currently implemented, may increase the relibility for different types of UCI transmission (e.g., channel state information (CSI) transmission, hybrid automatic repeat request (HARM) transmission, scheduling request (SR) transmission, etc.). In order to fulfill both reliability and latency requirements (e.g., for an ultra-reliable low-latency communication (URLLC) service), a different approach for PUCCH repetition is needed (e.g., an intra-slot PUCCH repetition approach).

SUMMARY

The present disclosure is directed to performing a two-step RA procedure in the next generation wireless networks.

In a first aspect of the present application, a method for performing a physical uplink control channel (PUCCH) repetition is provided. The method comprises receiving, from a base station, a physical downlink control channel (PDCCH) comprising downlink control information (DCI) in a control resource set (CORESET); determining a spatial domain filter for a PUCCH transmission based on an index associated with the CORESET; transmitting, to the base station, a PUCCH in a slot using the spatial domain filter; and transmitting, to the base station, a repeat of the PUCCH in one of the same slot or a different slot using the spatial domain filter.

In one implementation of the first aspect, the index associated with the CORESET comprises the lowest CORESET ID associated with an active downlink bandwidth part (BWP).

Another implementation of the first aspect further comprises receiving, from the base station, information related to transmission of the PUCCH through downlink signaling.

In another implementation of the first aspect, the downlink signaling comprises one of radio resource control (RRC) signaling, a medium access control (MAC) control element (CE), and DCI.

In another implementation of the first aspect, the information related to the transmission of the PUCCH is first information and the downlink signaling comprises RRC signaling, the method further comprising receiving, through one of DCI and a MAC CE, second information that either complement or overwrite the first information.

In another implementation of the first aspect, the information comprises at least one of an indicator for intra-slot PUCCH repetition transmission, an indicator for a number of PUCCH repetition transmissions, and an indicator for a symbol level time offset between each intra-slot repetitive PUCCH resource.

In another implementation of the first aspect, the CORESET is associated with an active BWP received from the base station, the method further comprising forgoing transmitting any additional repetitive PUCCH to the base station after determining that the BWP is no longer active.

Another implementation of the first aspect further comprises determining that a resource for the repeat PUCCH overlaps with another physical channel resource; and dropping one of the another physical channel and the repeat PUCCH based on a predefined rule.

In another implementation of the first aspect, the repeat of the PUCCH is a first PUCCH repeat; and transmitting the first PUCCH repeat comprises transmitting the first PUCCH repeat to the base station through a first transmission reception point (TRP), the method further comprising transmitting a second PUCCH repeat to the base station in the same slot of the subframe using a second TRP.

In another implementation of the first aspect, the CORESET is a first CORESET;
the first PUCCH repeat is associated with the first CORESET received from the base station; and the second PUCCH repeat is associated with a second CORESET received from the base station.

In another implementation of the first aspect, the repeat of the PUCCH is a first PUCCH repeat, the method further comprising transmitting a second PUCCH repeat to the base station using a different spatial domain filter.

In a second aspect of the present application, a user equipment (UE) for performing a physical uplink control channel (PUCCH) repetition is provided. The UE comprises one or more non-transitory computer-readable media having computer-executable instructions for transmitting physical uplink control channel (PUCCH) repetition; and at least one processor coupled to the one or more non-transitory computer-readable media, and configured to execute the computer-executable instructions to: receive, from a base station, a physical downlink control channel (PDCCH) comprising downlink control information (DCI) in a control resource set (CORESET); determine a spatial domain filter for a PUCCH transmission based on an index associated with the CORESET; transmit, to the base station, a PUCCH in a slot using the spatial domain filter; and transmit, to the base station, a repeat of the PUCCH in one of the same slot and a different slot using the spatial domain filter.

In one implementation of the second aspect, the index associated with the CORESET comprises the lowest CORESET ID associated with an active downlink bandwidth part (BWP).

In another implementation of the second aspect, the at least one processor is further configured to execute the computer-executable instructions to: receive, from the base station, information related to transmission of the PUCCH through downlink signaling.

In another implementation of the second aspect, the downlink signaling comprises one of radio resource control (RRC) signaling, a medium access control (MAC) control element (CE), and DCI.

In another implementation of the second aspect, the information comprises at least one of an indicator for intra-slot PUCCH repetition transmission, an indicator for a number of PUCCH repetition transmissions, and an indicator for a symbol level time offset between each intra-slot repetitive PUCCH resource.

In another implementation of the second aspect, the CORESET is associated with a bandwidth part (BWP) received from the base station, wherein the at least one processor is further configured to execute the computer-executable instructions to forgo transmitting any additional repetitive PUCCH to the base station after determining that the BWP is no longer active.

In another implementation of the second aspect, the at least one processor is further configured to execute the computer-executable instructions to: determine that a resource for the repeat PUCCH overlaps with another physical channel resource; and drop one of the another physical channel and the repeat PUCCH based on a predefined rule.

In another implementation of the second aspect, the PUCCH includes hybrid automatic repeat request-acknowledgement (HARQ-ACK) information for a received physical downlink shared channel (PDSCH) associated with the CORESET.

In another implementation of the second aspect, the repeat of the PUCCH is a first PUCCH repeat, wherein the at least one processor is further configured to execute the computer-executable instructions to: transmit a second PUCCH repeat to the base station using a different spatial domain filter.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
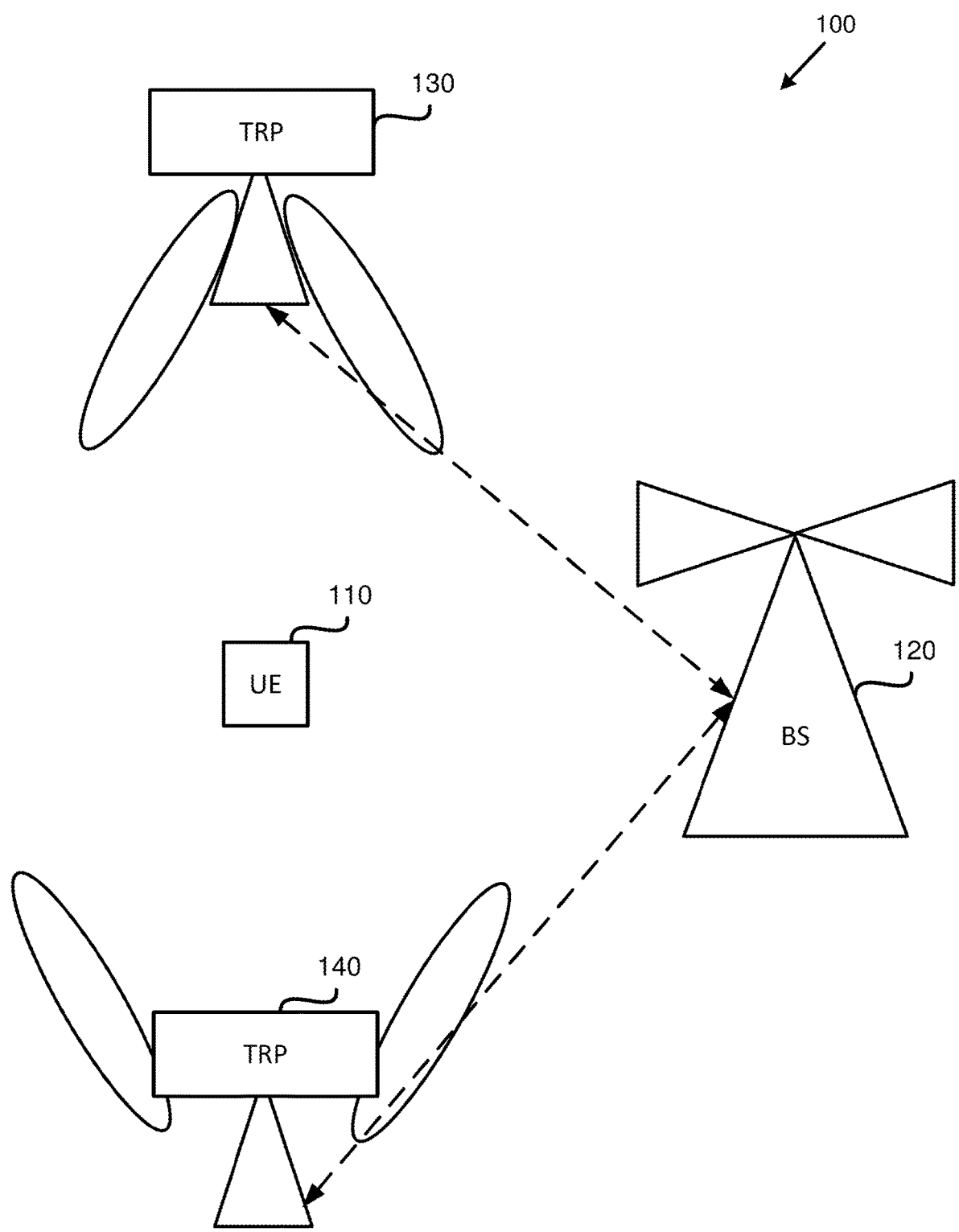
FIG. 1 is a diagram illustrating a multiple TRP wireless transmission, according to one example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one Base Station (BS), at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

As described above, some of the present implementations provide a method for intra-slot PUCCH repetition for both long and short. PUCCH formats. As PUCCH resources may collide with each other, some of the present implementations provide different rules to handle the collision issue in an intra-slot PUCCH repetition case. Additionally, the use of multiple transmission reception points (TRPs) in order to harvest more diversity gains is a promising way to control the tradeoff among standardization effort, deployment cost, and performance. As such, for a PUCCH repetition that is based on multiple TRPs (e.g., to increase diversity gain for a robust transmission), some of the present implementations provide a method that leverages spatial domain filters for PUCCH resources for both intra-slot/inter-slot PUCCH repetitions. Furthermore, some of the present implementations may provide a method for handling a HARQ process number (e.g., obtained by a higher layer) when the UE operates in a multiple TRP scenario.

As described, the PUCCH repetition may apply only to a single PUCCH format (e.g., a long PUCCH format, such as PUCCH format 1, PUCCH format 3, and PUCCH format 4). Some of the present implementations may extend the PUCCH repetition to short PUCCH format, such as PUCCH format 0 and PUCCH format 2, to fulfill the reliability and latency requirements at the same time. It should be noted that any and all of the implementations described above and below for an intra-slot repetition are not restricted to the short PUCCH format only and may equally apply to the long PUCCH format as well. Similarly, any and all implementations described above and below for the intra-sot repetition may equally apply to the inter-slot repetition as well. It should also be noted that in the implementations, described above and below, the term the "first repetitive PUCCH resource" may refer to the first PUCCH that is triggered by an RRC signaling, or a medium access control (MAC) control element (CE), or DCI/UCI, and the term the "repetitive PUCCH transmission" may refer to the PUCCH that is transmitted after the first repetitive PUCCH resource.

In some of the present implementations, there may be a bit dedicated in the PUCCH configuration (e.g., in RRC signaling) as an indicator to activate (or deactivate) intra-slot PUCCH repetition. For example, when the dedicated bit is "1" it may mean that the UE may perform the intra-slot PUCCH repetition, and "0" may mean that the UE may not perform the intra-slot PUCCH repetition (or vice versa, i.e., "1" means that UE performs the intra-slot PUCCH and "0" means that UE does not perform the intra-slot repetition). In one implementation, there may also be a bit in the PUCCH configuration that indicates the number of intra-slot repetitions for the PUCCH transmission. In one implementation, there is also a bit in the PUCCH configuration for indicating the symbol-level time offset between each intra-slot repetitive PUCCH resource.

In some of the present implementations, the time offset may be counted from the last OFDM symbol of the first PUCCH to the first OFDM symbol of the second PUCCH (e.g., the next repetitive PUCCH from the first PUCCH). In one implementation, the time offset may be counted from the first OFDM symbol of the first PUCCH to the first OFDM symbol of the second PUCCH. In yet another implementation, the time offset may be counted as an absolute time value (e.g., in milliseconds (ms)). In some of the present implementations, the UE may not be expected to be configured with a PUCCH resource that is transmitted across a slot boundary, for example, during a PUCCH repetitive transmission. In some of the present implementations, the described configuration may be used to set (or activate) the PUCCH repetition for a PUCCH resource, or a PUCCH resource set.

In some of the present implementations, the above described repetition configuration may be per BWP and may be activated only when the corresponding BWP is activated. More specifically, after the first repetitive PUCCH transmission is performed, the UE may omit the repetitive PUCCH transmission while a BWP switching is occurred (e.g., the switching timing may be before the repetitive PUCCH transmission).

In some of the present implementations, the above described one-bit indicator in the PUCCH repetition configuration (e.g., "1" meaning that UE may perform PUCCH repetition, and "0" meaning that UE may not perform PUCCH repetition) may be carried in a MAC CE signaling to activate intra-slot PUCCH repetition. In one implementation, there is also a bit field in the MAC CE signaling to indicate the number of intra-slot repetitions of a PUCCH transmission. In one implementation, there is also a bit field in the MAC CE signaling to indicate the symbol-level time offset between each intra-slot repetitive PUCCH resource. The time offset may be counted from the last OFDM symbol of the first PUCCH to the first OFDM symbol of the second PUCCH (e.g., the next repetitive PUCCH from the first PUCCH), or the time offset may be counted from the first OFDM symbol of the first PUCCH to the first OFDM symbol of the second PUCCH.

In some of the present implementations, the UE may not be expect to be indicated a PUCCH resource that may be transmitted across the slot boundary during a PUCCH repetitive transmission. In some of the present implementations, the indicator bit may be used to set/activate the PUCCH repetition for a PUCCH resource, while the PUCCH resource may be indicated by a PUCCH Resource ID, for example, in an information element (IE) of the MAC CE signaling, or by the PUCCH resource ID associated with the configuration indicated by the MAC CE signaling (e.g., the PUCCH resource associated with the CSI report configuration ID may be indicated by the SP CSI reporting on the PUCCH MAC CE). In some of the present implementations, if multiple active BWPs are supported by the configuration, a MAC CE comprising a bitmap (or bit stream) may be used to indicate the active/inactive PUCCH repetitions for the respective MVPs (e.g., a MAC CE received on a first BWP may be used to control the activation/deactivation of the PUCCH repetitions of a second BWP).

In some of the present implementations, the above described one-bit indicator may be in the DCI signaling to activate intra-slot PUCCH repetition. In one implementation, there is also a bit field in the DCI signaling to indicate the number of intra-slot repetitions of a PUCCH transmission. In one implementation, there is also a bit field in the DCI signaling to indicate the symbol-level time offset between each intra-slot repetitive PUCCH resource. The time offset may be counted from the last OFDM symbol of the first PUCCH to the first OFDM symbol of the second PUCCH (e.g., the next repetitive PUCCH from the first PUCCH), or may be counted from the first OFDM symbol of the first PUCCH to the first OFDM symbol of the second PUCCH. The UE of some of the present implementations may not be expected to be indicated a PUCCH resource that is transmitted across the slot boundary during a PUCCH repetitive transmission. In some of the present implementations, the above indication may be used to set/activate the PUCCH repetition for a PUCCH resource, and the PUCCH resource may be indicated by a HARQ resource ID in the IE of the DCI signaling and/or by the first CCE index of the PDCCH containing the DCI signaling that triggers the HARQ feedback.

In some of the present implementations, the activation/deactivation and the configuration for intra-slot PUCCH repetition may be implemented by a multi-stage method, for example, by combining all of the approaches described above (e.g., with respect to the RRC signaling, MAC CE signaling, and DCI signaling). For example, in one implementation, the method may use a combination of RRC+DCI signaling. For example, the time offset between each PUCCH repetition may be configured with the RRC signaling, while the number of repetitions may be indicated in the DCI signaling. In one implementation, the method may use a combination of RRC+MAC-CE+DCI signaling. For example, the time offset between each PUCCH repetition may be configured by the RRC signaling, and the MAC CE may activate/deactivate the PUCCH repetition for each PUCCH resource. The DCI signaling may be used to indicate the number of repetition for the PUCCH transmission. In some of the present implementations, if there are more than one activation/deactivation bit field for the intra-slot PUCCH repetition in DCI, MAC CE, and/or RRC signaling, the UE may consider only one activation/deactivation bit field as a valid indicator, followed by the priority order of the DCI, MAC CE, and then RRC signaling.

In some of the present implementations, there may be two separate indicators, for example, one for the intra-slot PUCCH repetition (e.g., "1" meaning UE performs intra-slot PUCCH repetition, and "0" meaning UE does not perform intra-slot PUCCH repetition), and another one for inter-slot PUCCH repetition (e.g., "1" meaning UE performs inter-slot PUCCH repetition, and "0" means UE does not perform inter-slot PUCCH repetition). In some such implementations, if both intra-slot and inter-slot PUCCH repetition indicators are set to "1", the UE may perform both transmit repetitive PUCCH resource within a slot and also across more than one slots, and each slot may have the same number of repetitive intra-slot PUCCH transmissions.

In some of the present implementations, the time offset between each repetitive PUCCH resource may be related to the spatial domain filter/UE antenna panel applied for each repetitive PUCCH resource. For example, if the repetitive PUCCH resource is transmitted by the same UE antenna panel, then the time offset may be fixed to zero. On the other hand, if the repetitive PUCCH resource is transmitted from different UE antenna panels, then the time offset may be fixed to several OFDM symbols.

In some of the present implementations, there may be a threshold for the time offset, and the threshold may be related to the spatial domain filter/UE antenna panel applied for each repetitive PUCCH resource. Moreover, the threshold may be configured by the base station (BS), may be reported by the UE as the UE's capability, or may be predefined (e.g., in the specification) which may be related to the numerology, or the UE's capability. For example, if the repetitive PUCCH resource is transmitted by the same UE antenna panel, the UE may not need to consider the time offset threshold when the UE transmits each repetitive PUCCH resource. On the other hand, if the repetitive PUCCH resource is transmitted from different UE antenna panels, then the time offset threshold may be a number of OFDM symbols (or slots).

In some of the present implementations, the UE may not transmit the repetitive PUCCH if the time offset between the first and the second repetitive PUCCH resources is smaller than a threshold. In some of the present implementations, whether to apply the time offset threshold may depend on whether the UE has turned on all of the UE antenna panels for the PUCCH transmission or not. If the UE is in a power saving state, or the UE has turned off some of the UE antenna panels which are configured for one of the repetitive PUCCH resources, the UE may have to consider the time offset threshold when the UE transmits the repetitive PUCCH.

In some of the present implementations, there may not be any configuration or indication for the number of repetitions for the PUCCH transmission. In some such implementations, the UE may autonomously calculate the number of repetitions based on the remaining OFDM symbols in a slot for repetitive PUCCH transmissions, and the length of the repetitive PUCCH resources and/or time offset between each repetitive PUCCH resource. For example, if the remaining OFDM symbols in a slot is 6 symbols, the time offset may be "2 symbols" (in this example, the time offset is calculated from the starting symbol of the first PUCCH resource to the starting symbol of the next repetitive PUCCH resource), and the length of each repetitive PUCCH resource may be "2 symbols", and therefore the number of repetitive PUCCH transmissions may be "2" (e.g., "1" for the first PUCCH resource and "1" for the repetitive PUCCH resource). In some of the present implementations, the UE may not expect to transmit a PUCCH resource, that is transmitted across the slot boundary, during the PUCCH repetitive transmission.

In some of the present implementations, the UE may report a capability related to the PUCCH repetition within a slot, the maximum number of PUCCH repetitions within a slot, and/or the minimum time offset value between each repetitive PUCCH resource. In some of the present implementations, the activation/deactivation bit, the number of PUCCH repetition within a slot, and/or the time offset value between each repetitive PUCCH resource may be optionally configured/indicated. The UE may consider whether there is a PUCCH repetition within a slot if the UE has not received any configuration related to the activation/deactivation bit, the number of PUCCH repetition within a slot, and/or the time offset value. In some of the present implementations, the UE's capabilities of maximum number of PUCCH repetition within a slot, and/or the minimum time offset value between each repetitive PUCCH resource, may be numerology specific (e.g., the UE may report different values for different numerologies).

In some of the present implementations, the UE may activate a PUCCH repetition according to the DCI that triggers the PUCCH transmission (e.g., for both of the A-CSI report on PUCCH and the HARQ feedback). In one implementation, if the DCI is scrambled by an MCS-RNTI, or by some new RNTI for the URLLC service other than the C-RNTI, the UE may perform the PUCCH repetition when the DCI triggers the PUCCH transmission. In one implementation, if the DCI is transmitted by a repetition PDCCH, the UE may perform the PUCCH repetition when the DCI triggers the PUCCH transmission.

In some of the present implementations, the repetition number of PUCCH may be the same as the number of repetitions for the PDCCH that triggers the PUCCH transmission. In some of the present implementations, the UE may not reach the same repetitive number as the PDCCH repetition for the PUCCH transmission, for example, when the UE does not have enough resources for the PUCCH transmission for the HARQ feedback before the UE has to transmit another PUCCH resource for the HARQ feedback. In one implementation, if the DCI is a compact DCI, which may contain less bits than a non-fallback DCI (a non-fail back DCI is a DCI format 0_1 or DCI format 1_1), the UE may perform the PUCCH repetition when the DCI triggers the PUCCH transmission. In yet one implementation, if the DCI contains a bit field to indicate the number of PDSCH repetitions, the UE may perform the PUCCH repetition when the UE transmits the HARQ feedback for the PDSCH.

In some of the present implementations, the repetition number of PUCCH may be the same as the number of PDSCH repetitions indicated in the DCI. In one implementation, the UE may activate the PUCCH repetition according to the PUSCH repetition/PDSCH repetition that is configured in the RRC signaling. For example, if the number of PUSCH repetitions is "2" (e.g., configured by the BS), the UE may perform the PUCCH repetition for all the PUCCHs in the same BWP/Carrier as the PUSCH. In some of the present implementations the repetitive number of PUCCH transmissions may be the same as, or different from, the repetitive number of the PUSCH/PDSCH. In one implementation, an implicit signaling may be applied for controlling the activation/deactivation of the PUCCH repetition. For example, if the DCI contains a bit field to indicate whether the DCI is for eMBB or for URLLC and a one-bit indicator in which "1" means this DCI is for scheduling URLLC PDSCH, the UE may apply the PUCCH repetition for the PUCCH transmission that contains the HARQ feedback of the PDSCH.

In some of the present implementations, the number of PUCCH repetitions may be the same as the number of UE antenna panels. In some of the present implementations, there may be independent information field for activating/deactivating the PUCCH repetition and the number of PUCCH repetitions. If the UE is only indicated to activate the PUCCH repetition, the UE may consider the number of PUCCH repetitions to be the same as the number of the UE antenna panels.

In some of the present implementations, the UE may select the spatial domain filter/UE antenna panel for the PUCCH repetition transmission based on the spatial domain filter of the control resource set (CORESET) where the UE receives the PDCCH to trigger the PUCCH transmission and repetition. For example, if the CORESET of the PDCCH is configured with spatial domain filter "CRI #1" and the UE knows that the "CRI #1" is received by the UE antenna panel #1, then the UE may apply the spatial domain filter that is associated with "CRI #1" for all the repetitive PUCCH resources. In some of the present implementations, the UE may receive more than one PDCCHs from the different CORESETs, and those CORESETs may be received by different spatial domain filters (e.g., CRI #1 and CRI #10), and both of the PDCCHs may indicate the same PUCCH resource for transmitting the HARQ feedback. In this type of situation, the UE may transmit the first repetitive PUCCH resource based on the spatial domain filter that is associated with a first CORESET based on a predefined rule (e.g., CRI #1) and the second repetitive PUCCH resource may be transmitted based on the spatial domain filter which is associated with a second CORESET based on a predefined rule (e.g., CRI #10), and so on.

In some of the present implementations, the spatial domain filters for the CORESET may be mapped to PUCCH repetitive resource cyclically. In some of the present implementations, the predefined rule for the order of spatial domain of a CORESET may be based on the CORESET ID, based on the cell ID associated with the CORESET, based on the search space type or search space ID associated with the CORESET, or based on the TRP ID associated with the CORESET.

In some of the present implementations, if both of the PDCCHs indicate the same PUCCH resource for transmitting the HARQ feedback, the UE may transmit the PUCCH resource based on the spatial domain filter of CORESET for each of the PDCCH at the same time. In some of the present implementations, this approach may apply when the UE is capable to transmit more than one PUCCH at the same time with different spatial domain filters.

In some of the present implementations, the UE may apply different treatments to the PUCCHs, as the two different approaches that are described above, based on the spatial domain filters associated with the PDCCHs. For example, if two spatial domain filters are received by the UE with different antenna panels at the same time, the UE may transmit the PUCCH with different spatial domain filter at the same time. Otherwise, the UE may apply the cyclic mapping rule for the PUCCH resource and spatial domain filter of the PDCCH.

In some of the present implementations, the UE may select the spatial domain filter/UE antenna panel for the PUCCH repetition transmission based on the spatial domain filter/UE antenna panel for receiving the PDSCH which triggers the HARQ feedback on the repetitive PUCCH. Moreover, the predefined rule for the mapping order between the spatial domain of the PDSCH to the PUCCH repetitive resource may be based on the CORESET ID of the scheduling PDCCH, the cell ID associated with the PDSCH, and/or the search space type, or search space ID, associated with the scheduling PDCCH.

For example, if a DCI schedules a PDSCH, a TCI state for the PDSCH, and indicates a PUCCH resource for transmitting the HARQ feedback for the PDSCH, the PUCCH spatial domain may apply the same spatial domain filter for all of the repetitive PUCCH resources. In some of the present implementations, the UE may receive more than one PDSCH from the same, or different CORESETs, and those PDSCHs may be received by different spatial domain filters (e.g., the first PDSCH may be received by CRI #1 and the second PDSCH mat be received by CRI #10), and both PDSCHs may be indicated to transmit the HARQ feedback on the same PUCCH resource. Then, the UE may transmit the first repetitive PUCCH resource based on the spatial domain filter associated with a first CORESET based on a predefined rule (e.g., CRI #1) and the second repetitive PUCCH resource based on the spatial domain filter associated with a second CORESET based on a predefined rule (e.g., CRI #10), and so on.

In some of the present implementations, when the UE only turns on a portion of the UE antenna panels, the UE may not consider the spatial domain filter that is associated with the deactivated (or inactive) antenna panel when the UE performs the cyclic mapping order rule. Such an implementation may be useful when each TRP in a multiple-TRP scenario performs scheduling for the UE independently.

Multiple TRP transmission or non-coherent joint-transmission (NC-JT) may provide a flexible way to dynamically configure a transceiver point (e.g., an antenna panel) according to practical applications.

FIG. 1 is a diagram 100 illustrating a multiple TRP wireless transmission, according to one example implementation of the present application. FIG. 1 includes a UE 110, a base station (e.g., a gNB) 120, and two TRPs 130 and 140. The TRPs 130 and 140 panels may be installed on the walls inside a room, outside a building, on top of streetlamps, or any other suitable installation point. The distributed antenna panels may be used jointly for downlink transmission to the users (e.g., the UE 110), or may be used at the transmitter in the wireless backhaul (e.g., between the TRPs 130, 140 and the BS 120).

The benefits of multi-panel multiple-input multiple-output (MIMO) may include less hardware cost and less power consumption. This is because more antenna elements integrated in a single panel may result in higher complexity of routing of circuit components and antenna elements. In addition, separating antenna panels at a proper distance may result in high multiplexing gain with the reduction of correlations between antennas. Therefore, new mechanisms for enabling and utilizing the benefit of multiple TRP transmission should be introduced.

Any channels may be benefited from the multiple TRP transmissions. The PUCCH repetition is not an exception, and therefore some of the present implementations combine the PUCCH repetition with the multiple TRP concept in new generation wireless networks. In some such implementations, different Spatial relationship information (represented by the variable Spatialrelationinfo) across the PUCCH repetitions may be supported. Below, some implementations that indicate/configure the Spatialrelationinfo for PUCCH for HARQ-ACK transmission to each TRP (or to each repetition) are described in more detail.

Currently, the HARQ process ID is indicated in the DCI (e.g., as a HARQ process number) where the index of the HARQ process may be from 0 to 15. The index of HARQ process may be used by a higher layer to distinguish and process data in different HARQ processes. In multiple TRP transmission, at least two PDSCH and two PDCCH from different TRPs are supported. As such, some of the present implementations may increase the maximum number of HARQ processes in order to help the higher layer to distinguish and process data received from different TRPs. For example, some of the present implementations may increase the maximum number of HARQ process ID to 32 (e.g., 16 times two for two TRPs). However, if the HARQ process number IE is carried by the DCI, the size of the DCI may be different than DCI size without multiple TRP transmissions. Hence, in some of the present implementations, the UE may calculate/obtain the actual HARQ process ID for the higher layer in order to distinguish and process the data.

In one implementation, the higher layer may set the HARQ process ID according to the HARQ process ID obtained from the DCI associated with the PDSCH/PUSCH (e.g., in addition to the UE antenna panel that is used to receive/transmit the PDSCH/PUSCH). For example, if the maximum HARQ process ID per UE antenna panel is 16 (e.g., configured by the RRC signaling), the higher layer may add 16 times "n" to the HARQ process ID that is obtained from the DCI, where "n" (i) is the index for the UE antenna panel which is used to receive/transmit the PDSCH/PUSCH, and (ii) may be assigned a number from 0 to N−1 (N being the total number of UE antenna panels). Alternatively, the maximum number of HARQ process ID for a UE may be explicitly indicated (e.g., through the RRC signaling).

In one implementation, the UE may not directly obtain the UE antenna panel index from the DCI. Instead, the UE may obtain the UE antenna panel information based on the spatial domain filter for the PDSCH/PUSCH. More specifically, the UE may obtain the UE antenna panel information based on the TCI/DMRS port group/SRI/spatial domain filter obtained from the DCI to find the associated antenna panel index for the PDSCH/PUSCH.

In one implementation, the HARQ process ID may be related to the UE antenna panel for a HARQ feedback. That is, the higher layer may set the HARQ process ID according to the HARQ process ID obtained in the DCI associated with the PDSCH (in addition to the UE antenna panel that is used to transmit the PUCCH for HARQ feedback). For example, if the maximum HARQ process ID per UE antenna panel is "16" (e.g., configured by RRC signaling), the higher layer may add 16 times "n" to the HARQ process ID obtained from the DCI, where "n" is the index of the UE antenna panel which is used to transmit the PUCCH and may be 0 to N−1 (N being the total number of UE antenna panel).

In some of the present implementations, the PUCCH resource may be obtained from the HARQ resource indicator in the DCI and/or the first CCE index containing from the DCI. It should be noted that a UE may not directly obtain the UE antenna panel index from the PUCCH resource, and instead the UE may obtain the UE antenna panel information based on the spatial domain filter for PUCCH. That is, the UE may obtain the UE antenna panel information based on the spatial domain filter information (e.g., CRI/SSB index/SRI) associated with the PUCCH resource in order to find the antenna panel index for the PUCCH.

In one implementation, the HARQ process ID may be related to the UE antenna panel for HARQ feedback. That is, the higher layer may set the HARQ process ID according to the HARQ process ID obtained from the DCI associated with the PDSCH/PUSCH (e.g., in addition to the UE antenna panel that is used to receive the PDCCH for the scheduling DCI.

In some of the present implementations, the PDCCH may be transmitted on the CORESET and the spatial domain filter of the CORESET may be obtained from the variable tci-StatesPDCCH carried in RRC signaling, and the MAC CE may indicate one of spatial domain filter contained in the tci-StatesPDCCH list. In some of the present implementations, the UE may not directly obtain the UE antenna panel index from the CORESET configuration, and instead the UE may obtain the UE antenna panel information based on the spatial domain filter for the PDCCH. That is, the UE may obtain the UE antenna panel information based on the spatial domain filter information (e.g., CRI/SSB index/SRI) associated with the CORESET in order to find the antenna panel index for the PDCCH.

In one implementation, if the UE does not support transmitting more than one physical channel (e.g., PDSCH, PDCCH, PUSCH or PUCCH, including both configured grant and dynamic grant cases) by multiple UE antenna panels at the same time, and the UE indicates it via capability negotiation signaling, the higher layer of the UE may set the HARQ Process ID to the HARQ Process ID contained in the DCI that is used to schedule the PDSCH/PUSCH.

In one implementation, the rule for the higher layer of the UE to set the HARQ process ID is based on different backhaul scenarios, different length of the bit-fields of the HARQ process number, and/or different DCI formats that the UE is expected to receive in multiple TRP scenarios. For example, if the UE is configured to use a single PDCCH for multiple TRPs (i.e., in an ideal backhaul case), the higher layer may set the HARQ process ID to the HARQ process ID that is contained in the DCI used to schedule PDSCH/PUSCH.

In some of the present implementations, in a single DCI case, there may be a new non-fallback DCI format (or the bit-fields of the HARQ ID in the DCI format for multiple TRP with single PDCCH case may have different length from the PDCCH for single TRP case) other than the DCI format 0_1 and DCI format 1_1 for multiple TRP scenario.

In some such implementations, the HARQ process number known by the higher layer may be directly obtained from the HARQ process number contained in the DCI. On the other hand, if the UE is configured to use multiple PDCCH for multiple TRPs (i.e., in a non-ideal backhaul case), the higher layer may set the HARQ Process ID to the HARQ Process ID contained in the DCI used to schedule the PDSCH/PUSCH (e.g., in addition to the UE antenna panel information).

In some of the present implementations, the UE antenna panel information may be obtained based on the UE antenna panel index/spatial domain filter used for transmitting/receiving the PDSCH/PDCCH/PUSCH/PUCCH, as described above. In some of the present implementations, in a multiple DCI case, the length of the bit-field of the HARQ process ID may remain the same, for example, as the bit-field of the HARQ process number described in release 15 (Rel-15) DCI format, and may be different from the length of the bit-field of the HARQ process ID for the bit-field of the HARQ process number in the DCI for a single PDCCH scenario in a multiple TRP operation.

Figure 2:
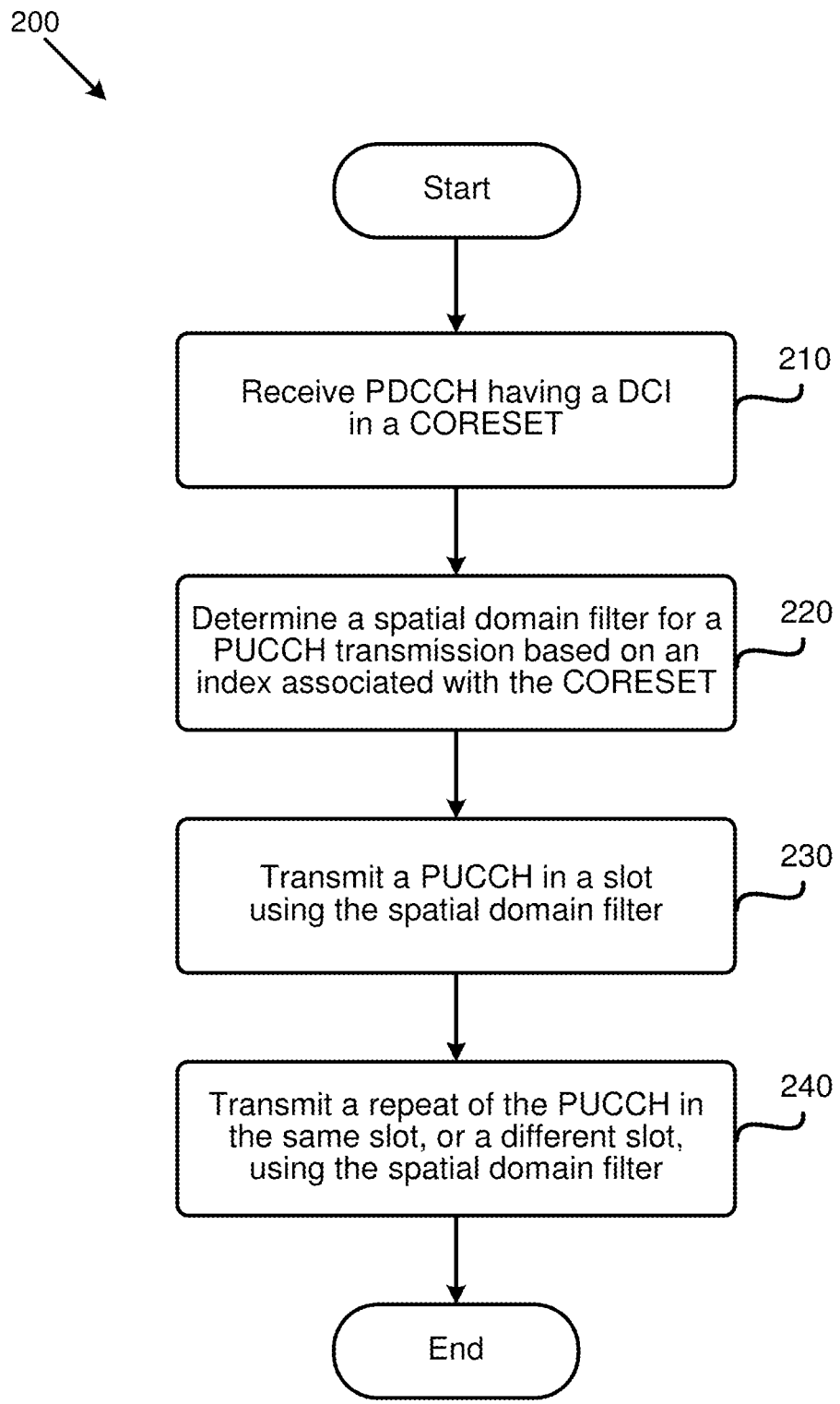
FIG. 2 is a flowchart illustrating a method (or process) of a UE for performing a PUCCH repetition, according to an example implementation of the present application.

FIG. 2 is a flowchart illustrating a method (or process) 200 of a UE for performing a PUCCH repetition, according to an example implementation of the present application. The process 200 may start in action 210 by receiving (e.g., from a base station) a PDCCH that may include downlink control information (DCI) carried in a CORESET. In some of the present implementations, before receiving the CORESET in the PDCCH, the method may receive information related to how to transmit the PUCCH through downlink signaling. In some other implementations the transmission related information may be received after, or concurrently with, receiving the PDCCH. In some of the present implementations, as described above and below, the information related to PUCCH transmission may include, but is not limited to, an indicator for intra-slot PUCCH repetition transmission, an indicator for a number of PUCCH repetition transmissions, and an indicator for a symbol level time offset between each intra-slot repetitive PUCCH resource.

In some of the present implementations, the downlink signaling may include one RRC signaling, a MAC CE, or DCI. In some of the present implementations, after the original information related to the transmission of the PUCCH is received (e.g., through RRC signaling), the method may later receive (e.g., through the DCI or the MAC CE), additional information related to the transmission of the PUCCH that may either overwrite the original information received through RRC signaling, or complete the original information (e.g., that was received through RRC signaling).

In action 220, the method may determine a spatial domain filter for the PUCCH transmission based on an index associated with the CORESET (e.g., the CORESET ID). For example, in some of the present implementations, the CORESET with the lowest index (or ID) may be used to determine the spatial domain filter for the PUCCH transmission. The method may then transmit (e.g., to the base station), in action 230, a first PUCCH in a slot (e.g., of a subframe) using the spatial domain filter. Based on the information received from the base station, the method may transmit, in action 240, at least one repetition of the PUCCH to the base station using the same slot, or a different slot. For example, as described above, an indicator in a MAC CE may indicate to the UE to transmit the PUCCH repetitions in the same slot (i.e., intra-slot PUCCH repetition) or in a different slot (inter-slot PUCCH repetition).

In some of the present implementations, the CORESET received in the PDCCH may be associated with a bandwidth part (BWP) that is received from the base station. In some such implementation, the method may transmit the repartitions of the PUCCH only during the time that the associated BWP is active, and as soon as the method determines that the BWP is deactivated, the method may forgo transmitting any additional repetitive PUCCH to the base station. In some of the present implementations, if the method determines that a resource for the repeat PUCCH overlaps with another physical channel resource, the method may drop either the other physical channel or the repeat PUCCH (e.g., based on a predefined rule).

In some of the present implementations, the UE may perform PUCCH transmission through more than one UE antenna panels. As such, the definition of "overlapping resource" may need to take the UE antenna panel/spatial domain filter information into the consideration. In some of the present implementations, a collision rule to handle the PUCCH resource collision may be applied when the priority level of all the overlapped PUCCH resources are the same. That is, if the priority level of the overlapped PUCCH resources are different, the UE may drop a PUCCH resource based on its priority order (e.g., a UCI type priority of HARQ-ACK>SR>CSI with higher priority>CSI with lower priority). Different panels/TRPs may be applied with different priority level or a common priority level may be applied for all panels/TRPs. In one implementation, an intra-slot repetition PUCCH may have a higher priority than other physical channels such as another PUCCH with/without inter-slot repetition, dynamic grant PUSCH, or configured grant PUSCH.

In one implementation, an intra-slot repetition PUCCH may have a lower priority than other physical channels, such as another PUCCH with/without inter-slot repetition, dynamic grant PUSCH, and/or configured grant PUSCH. For simplicity, in some of the present implementations, the PUCCH without repetition may be referred to as a single PUCCH. In one implementation, an intra-slot repetition PUCCH with a short PUCCH format, such as PF0/PF2 format may have a higher priority than an intra-slot repetition PUCCH with a long PUCCH format, such as PF1/PF3/PF4 format.

In one implementation, an intra-slot repetition PUCCH with a short PUCCH format, such as PF0/PF2 format may have a lower priority than an intra-slot repetition PUCCH with a long PUCCH format, such as PF1/PF3/PF4 format. In one implementation, the priority level of an intra-slot repetition PUCCH may depend on the number of overlapped repetitive PUCCH resources with other physical channels. For example, if a single PUCCH resource is overlapped with two intra-slot repetitive PUCCH resources, the UE may drop the single PUCCH resource, but transmit both two intra-slot repetitive PUCCH resources (e.g., to the base station). On the other hand, if a PUCCH resource only overlaps one intra-slot repetitive PUCCH resource, the UE may drop that overlapped repetitive PUCCH resource, but transmit the one remaining repetitive PUCCH resource and the single PUCCH resource.

In one implementation, the UE may decide whether to apply overlapping rule for the PUCCH and other physical channels, such as another PUCCH with/without intra-lot/inter-slot repetition, dynamic grant PUSCH, and/or configured grant PUSCH, according to the UE antenna panel information for transmitting each overlapped physical channel. For example, if an intra-slot repetitive PUCCH is overlapped with a single PUCCH, and the UE knows that the repetitive PUCCH resources are transmitted by different UE antenna panels based on the spatial domain filter associated with intra-slot repetitive PUCCH and the single PUCCH, then the UE may not apply overlapping rule. Instead, the UE may transmit both of the resources at the same time. On the other hand, if an intra-slot repetitive PUCCH is overlapped with a single PUCCH and the UE knows that they are transmitted by the same UE antenna panel based on the spatial domain filter associated with the intra-slot repetitive PUCCH and the single PUCCH, then the UE may drop the single PUCCH.

In one implementation, the UE may inform the BS whether the UE is capable of transmitting more than one physical channel on the overlapped resource with different spatial domain filters/UE antenna panels. In one implementation, the UE may always apply an overlapping rule when the UE is in a power saving state or when the UE only activates a portion of the UE antenna panel, or when DRX is configured.

In some of the present implementations, there may be a DCI/MAC CE signaling to indicate whether the UE may transmit more than one physical channel on the overlapped resource with different spatial domain filters/UE antenna panels per PUCCH resource. That is, in some such implementations, every time the UE is triggered to perform the PUCCH resource transmission, the UE may check the bit field in the latest DCI or the DCI triggering the PUCCH resource or may check the MAC CE for the PUCCH resource to find whether the BS indicates to the UE to transmit more than one uplink transmission on the overlapped resource with different spatial domain filters/UE antenna panels for the PUCCH resource or not.

In some of the present implementations, there may be an RRC signaling to indicate whether the UE may transmit more than one physical channel on the overlapped resource with different spatial domain filters/UE antenna panels, and the configuration may be per PUCCH resource, for all of the PUCCH resources configured in a PUCCH configuration (e.g., in the variable PUCCH-config), and/or for all uplink transmissions configured in the BWP/cell/cell group (e.g., in the variables BWP-UplinkDedicated/ServingCellConfig/CellGroupConfig).

In some of the present implementations, an uplink transmission may include all types of UL physical channel transmission, such as the PUCCH with/without intra/inter-slot repetition, dynamic grant PUSCH, or configured grant PUSCH, and/or all kinds of UL reference signals, such as PTRS, DMRS and SRS.

Figure 3:
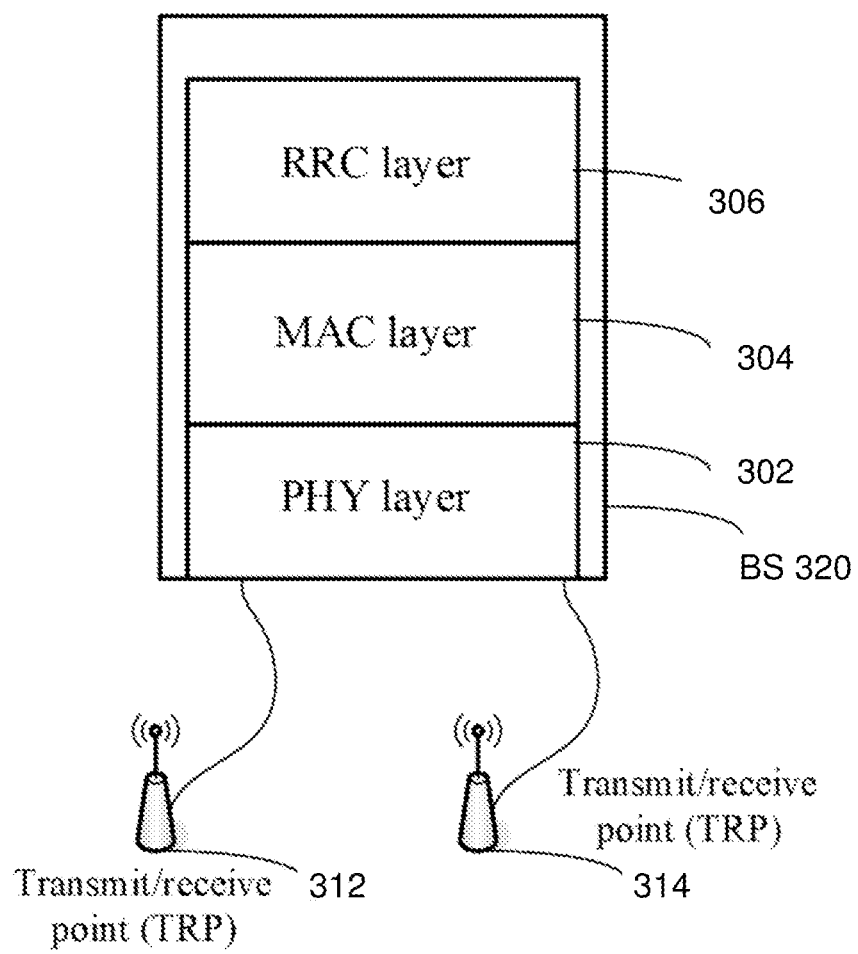
FIG. 3 is a schematic diagram illustrating an example architecture of a base station, in accordance with an example implementation of the present disclosure.

FIG. 3 is a schematic diagram 300 illustrating an example architecture of a base station, in accordance with an example implementation of the present disclosure. As shown in FIG. 3, a base station (BS) 320 may include a protocol stack that contains, among other protocol layers, an RRC layer 302, a MAC layer 304, and a Physical (PHY) layer 306. The BS 320 may further include a controller (not shown), such as a processor or a microcontroller to coordinate the activities of the various layers of the BS 320. In addition, the PHY layer 306 may be coupled to at least one Transmit/Receive Point (TRP) 312 and another TRP 314.

Each one of the TRPs 312 and 314 may be a macro-cell, a small-cell, a pico-cell, a femto-cell, a Remote Radio Head (RRH), a relay node, or a combination of antenna panels, which may be deployed anywhere, such as in the interior of a room, in/on a building, on top of a house or streetlamps, etc.

Figure 4:
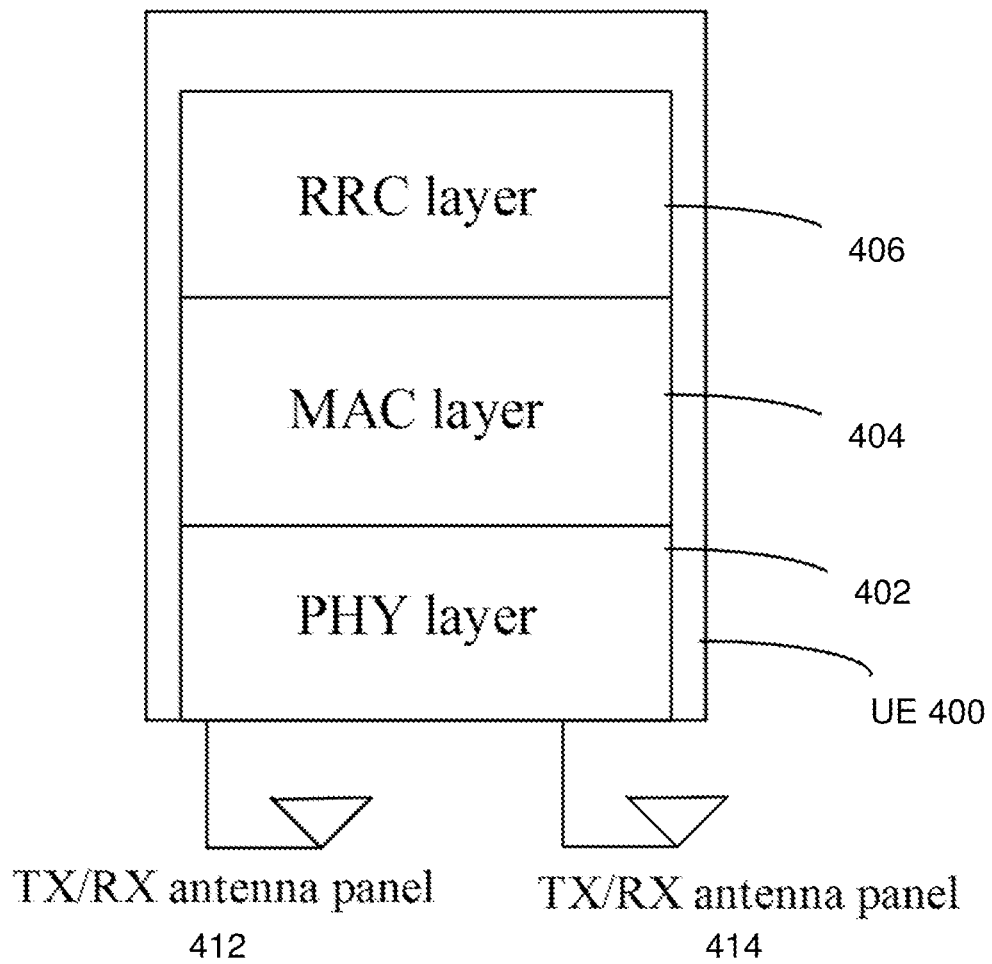
FIG. 4 is a schematic diagram illustrating an example architecture of a UE, in accordance with an example implementation of the present disclosure.

FIG. 4 is a schematic diagram illustrating an example architecture of a UE, in accordance with an example implementation of the present disclosure. As shown in FIG. 4, a UE 400 may include a protocol stack that contains, among other protocol layers, an RRC layer 402, a MAC layer 404, and a PHY layer 406). The PHY layer 406 may be coupled to at least one Transmit (TX)/Receive (RX) antenna component 412 and another TX/RX antenna 414 for transmitting and receiving signals. The UE 400 may further include a controller (not shown), such as a processor or a microcontroller to coordinate the activities of the various layers of the UE 400.

For example, the controller of the UE 400 may set and coordinate the PHY layer 406, the MAC layer 404, and the RRC layer 402 based on the received signals from either or both of the TX/RX antenna components 412 and 414. The controller may also set the parameter of transmission for the TX/RX antenna panels 412 and 414, and the parameter may indicate to the UE 400 to select both or one of the antenna panels for transmission/reception.

Figure 5:
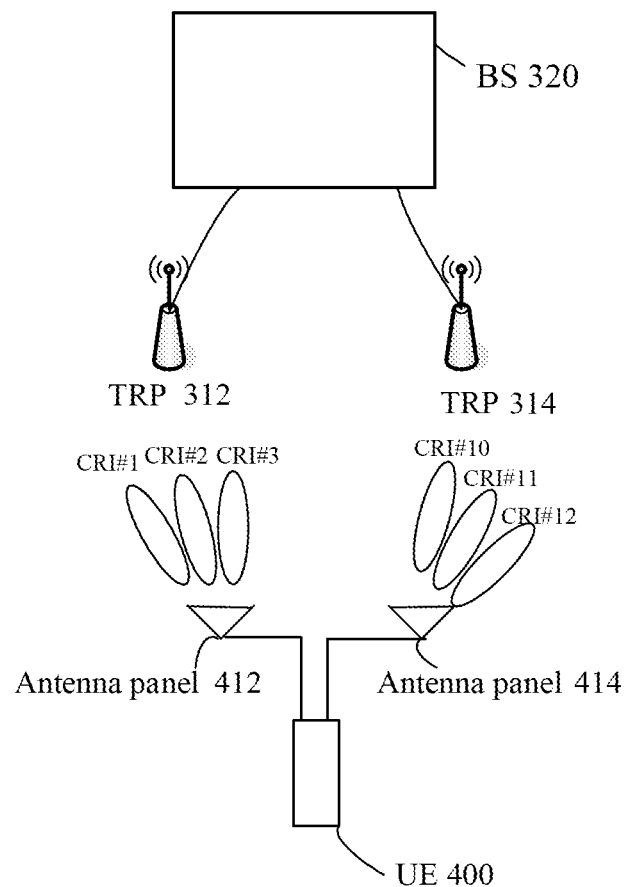
FIG. 5 is a schematic diagram illustrating the communication between a base station and a UE in a multiple TRP scenario, in accordance with an example implementation of the present disclosure.

FIG. 5 is a schematic diagram 500 illustrating the communication between a base station and a UE in a multiple TRP scenario, in accordance with an example implementation of the present disclosure. Specifically, FIG. 5 depicts the relationship between antenna panels of the UE 400 (shown in FIG. 4) and the TRPs of the BS 320 (shown in FIG. 3). Based on the configuration of the BS 320, the UE 400 may associate spatial domain filters named as "CRI #1", "CRI #2", and "CRI #3" with the antenna panel 412, and spatial domain filters named as "CRI #10", "CRI #11", and "CRI #12" with the antenna panel 414. Moreover, the spatial domain filter "CRI #1" here means, the UE 400 may apply the spatial domain filter that the UE selected to receive the most recent CSI resource #1 for transmission and reception.

In some of the present implementations, the BS 320 may transmit the DCI to the UE 400 in the symbol #0 to symbol #2 of slot #n, and the DCI may contain the scheduling information for the PDSCH and the corresponding PUCCH for the HARQ feedback. The DCI may contain the PUCCH resource indicator (i.e., PRI) which may indicate to the UE to use the PUCCH resource #1 for the HARQ feedback. The DCI may also contain the PDSCH-to-HARQ_feedback timing indicator (i.e., K1 indicator) which may indicate to the UE to transmit the HARQ feedback on slot #n+4. Since the PUCCH resource #1 is configured to be applied for the PUCCH repetition based on PUCCH resource configuration in the RRC signaling and the PUCCH resource #1 is started from the symbol #4 in a slot and the length of the slot is two OFDM symbols, the UE may transmit the first repetitive PUCCH for the HARQ feedback of the PDSCH on the OFDM symbol #4 and symbol #5 in slot #n+4, the second repetitive PUCCH on the OFDM symbol #6 and symbol #7, and so on. The last repetitive PUCCH may be transmitted on the symbol #12 and #13. In one implementation, if the PUCCH resource #1 started from the symbol #5, then the last repetitive PUCCH may be transmitted on the symbol #11 and symbol #12. Since the UE 400 is not expected to transmit the repetitive PUCCH across slot boundary, the UE 400 may not transmit the PUCCH on the symbol #13 of slot #n+5 and symbol #0 of slot #n+5.

Alternatively, the UE 400 may receive a MAC-CE signaling which activates PUCCH repetition transmission for PUCCH resource #1 based on the PUCCH resource ID and activate/deactivate indicator (i.e., A/D field) of the MAC-CE.

Alternatively, the UE 400 may receive PUCCH repetition indicator which activates/deactivates the PUCCH repetition for HARQ feedback of the scheduling PDSCH in the DCI. In some of the present implementations UE may not expect to be indicate different PUCCH repetition behavior (e.g., indicate an "turn-off" indicator when previous DCI/MAC-CE indicate this PUCCH resource is repetitive transmission) if UE may multiplex more than one HARQ feedback in one PUCCH resource.

Alternatively, the PUCCH resource #1 is configured to be applied PUCCH repetition and the number of repetition is "2" based on PUCCH resource configuration in RRC signaling and the PUCCH resource #1 is started from the symbol #4 in a slot and the length is two OFDM symbols, UE may transmit the first repetitive PUCCH for HARQ feedback of the PDSCH on the OFDM symbol #4 and symbol #5 in slot #n+4, and the second repetitive PUCCH on the OFDM symbol #6 and symbol #7 in slot #n+4.

Alternatively, the UE 400 may receive a MAC CE signaling which may indicate that the UE may transmit the PUCCH resource repetitively, where the first repetitive PUCCH is on the OFDM symbol #4 and symbol #5 in slot #n+4 and the second repetitive PUCCH is on the OFDM symbol #6 and symbol #7 in slot #n+4. The MAC CE may contain the PUCCH resource ID which may indicate the PUCCH resource #1 and the number of repetition is "2".

Alternatively, the UE 400 may receive a number in the PUCCH repetition indicator (e.g., 2) which may indicate the PUCCH repetition for HARQ feedback of the scheduling PDSCH on the DCI. Since the PRI and K1 indicators of the DCI may indicate to the UE to transmit the HARQ feedback on the PUCCH resource #1 in slot the UE may transmit the first repetitive PUCCH for HARQ feedback of the PDSCH on the OFDM symbol #4 and symbol #5 in slot #n+4, and the second repetitive PUCCH on the OFDM symbol #6 and symbol #7 in slot #n+4.

Alternatively, the PUCCH resource #1 may be configured to apply the PUCCH repetition and the time offset between the repetitive PUCCH resource may be "1 symbol" based on the PUCCH resource configuration in the RRC signaling and the PUCCH resource #1 may be started from the symbol #4 in a slot and the length may be two OFDM symbols. With this configurations, the UE may transmit the first repetitive PUCCH for the HARQ feedback of the PDSCH on the OFDM symbol #4 and symbol #5 in slot #n+4, and the second repetitive PUCCH on the OFDM symbol #7 and symbol #8 in slot #n+4, and so on.

Alternatively, the UE 400 may receive a MAC CE signaling which may indicate that the UE may transmit the PUCCH resource repetitively, where the first repetitive PUCCH is on the OFDM symbol #4 and symbol #5 in slot #n+4 and the second repetitive PUCCH is on the OFDM symbol #7 and symbol #8 in slot #n+4, and so on. The MAC CE may contain the PUCCH resource ID which may indicate the PUCCH resource #1 and the time offset between repetitive PUCCH resources is "1 symbol".

Alternatively, the UE 400 may receive the time offset for each repetitive PUCCH resource (e.g., 1 symbol) for PUCCH repetition of the HARQ feedback of the scheduling PDSCH on the DCI. Since the PRI and K1 indicators of the DCI may indicate to the UE to transmit the HARQ feedback on the PUCCH resource #1 in slot #n+4, the UE may transmit the first repetitive PUCCH for the HARQ feedback of the PDSCH on the OFDM symbol #4 and symbol #5 in slot #n+4, and the second repetitive PUCCH on the OFDM symbol #7 and symbol #8 in slot #n+4, and so on.

Alternatively, the time offset of each repetitive PUCCH resource may be counted from the first symbol of the first repetitive PUCCH to the first symbol of the second repetitive PUCCH. In this case, the PUCCH resource #1 may be configured to apply the PUCCH repetition and the time offset between the repetitive PUCCH resources may be "1 symbol" based on the PUCCH resource configuration in the RRC signaling. The PUCCH resource #1 may be started from the symbol #4 in a slot and its length may be two OFDM symbols. The UE may transmit the first repetitive PUCCH for the HARQ feedback of the PDSCH on the OFDM symbol #4 and symbol #5 in slot #n+4, and the second repetitive PUCCH on the OFDM symbol #5 and symbol #6 in slot #n+4. The first and second PUCCH resources may apply different spatial domain filters or may be transmitted from different antenna panels (e.g., the first repetitive PUCCH resource may be transmitted from the antenna panel 412 and the second one may be transmitted from the antenna panel 414).

Alternatively, the PUCCH resource #1 may be configured with more than one spatial domain filters (e.g., the CRI #1 and CRI #2), and the UE may consider these two spatial domain filters are transmitted from the same antenna panel 412 as shown in FIG. 5. The UE may assume that the time offset for repetitive PUCCH is "0 symbol". The UE may transmit the first repetitive PUCCH for the HARQ feedback of the PDSCH on the OFDM symbol #4 and symbol #5 in slot #n+4, and the second repetitive PUCCH on the OFDM symbol #6 and symbol #7 in slot #n+4. In some of the present implementations, the UE may not assume the time offset value between repetitive PUCCH resources, but may assume the second repetitive PUCCH resource may start from the next symbol from the last symbol of the first repetitive PUCCH resource.

Alternatively, the PUCCH resource #1 may be configured with more than one spatial domain filters (e.g., CRI #1 and CRI #10), and the UE may know these two spatial domain filters are transmitted from different antenna panels (e.g., panels 412 and 414, as shown in FIG. 5). The UE may assume that the time offset for repetitive PUCCH is "0 symbol". As such, the UE may transmit the first repetitive PUCCH for the HARQ feedback of the PDSCH on the OFDM symbol #4 and symbol #5 in slot #n+4, and the second repetitive PUCCH on the OFDM symbol #4 and symbol #5 in slot #n+4. In some of the present implementations, the UE may not expect the number of spatial domain filters for a PUCCH repetition to exceed the maximum number of the antenna panels of the UE. In some of the present implementations, the maximum number of the antenna panels of the UE may be based on the UE capability and/or the RRC signaling.

In some of the present implementations, the UE may not assume any time offset value between the repetitive PUCCH resources. Instead, the UE may assume that the second repetitive PUCCH resource may be transmitted on the same OFDM symbol as the first repetitive PUCCH resource. In some of the present implementations, if the UE 400 has not turned on both antenna panels 412 and 414, or the UE is in a power saving state, the time offset between two repetitive PUCCH resources may be longer than the case in which the UE has turned all the antenna panels on, or the UE is not in the power saving state. In some of the present implementations, a UE may be in a power saving state when the UE receives a power saving signal, a power saving indication in the DCI, a power saving profile, or other signals/indicators that make the UE wake up, or go to sleep.

Alternatively, there may be a predefined time offset threshold in the specification and the time offset threshold, for example, may be "5 symbols". If the PUCCH resource #1 is configured to apply PUCCH repetition and the time offset between the repetitive PUCCH resources is "1 symbol" when the UE turns off the antenna panel 414 due to power saving state, the UE may transmit the first repetitive PUCCH which applies the spatial domain filter related to "CRI #1" on the OFDM symbol #4 and symbol #5 in slot #n+4, but the UE may not transmit the repetitive PUCCH resource which applies the spatial domain filter related to the "CRI #10" before the OFDM symbol #9 or symbol #10 in slot #n+4 (e.g., depending on the starting point to count the time offset). In some of the present implementations, the UE may still transmit the repetitive PUCCH resource that is transmitted from the antenna panel 412.

Alternatively, if the scheduling DCI is scrambled (e.g., by the MCS-RNTI), the UE 400 may consider the PUCCH that is indicated by the scheduling DCI for the HARQ feedback of the PDSCH to apply the PUCCH repetition. In some of the present implementations, the number of repetitions may be configured in the RRC/MAC-CE/DCI signaling of the indicated PUCCH resource.

In some of the present implementations, the BS 320 may transmit two DCIs to the UE 400 in the symbol #0 to symbol #2 of slot #n, and one of the DCIs may be transmitted on a CORESET #1 from the TRP 312 of FIG. 5 and another DCI may be transmitted on a CORESET #2 from the TRP 314 as shown in FIG. 5. The UE 400 may receive the DCI from the TRP 312 based on the spatial domain filter marked as "CRI #1" and receive the DCI from the TRP 314 based on the spatial domain filter marked as "CRI #10". Meanwhile, both of the DCIs may contain the PRI which may indicate to the UE to transmit the HARQ feedback on the PUCCH resource #1, and the PUCCH resource #1 may be configured to perform the PUCCH repetition based on RRC signaling.

Since the UE 400 may have the capability to perform two transmissions at the same time by the antenna panel 412 and antenna panel 414, the UE may transmit two repetitive PUCCH resources for the HARQ feedback. The first PUCCH resource may be transmitted by the spatial domain filter marked as "CRI #1" and the second PUCCH resource may be transmitted by the spatial domain filter marked as "CRI #10", due to the lower CORESET ID of the DCI associated with "CRI #1". In another case, if the PUCCH resource #1 is configured with the number of repetition "4", the UE may transmit 4 repetitive PUCCH resources by the spatial domain filters marked as "CRI #1", "CRI #10", "CRI #1" and "CRI #10", respectively. In some of the present implementations, repetitive PUCCH resources may not be overlapped with each other and may be configured with a time offset between each repetitive PUCCH resource.

In one implementation, the UE may transmit the repetitive PUCCH resources independent of each DCI. In this case, if the PUCCH resource #1 is configured with the number of repetition "4", the UE may transmit 4 repetitive PUCCH resources by spatial domain filters marked as "CRI #1", "CRI #1", "CRI #1" and "CRI #1", respectively, from the antenna panel 412, and transmit 4 repetitive PUCCH resources by spatial domain filters marked as "CRI #10", "CRI #10", "CRI #10" and "CRI #10", respectively, from the antenna panel 414. In some of the present implementations, repetitive PUCCH resources may be transmitted on the overlapped resource.

In some of the present implementations, the BS 320 may transmit one DCI to the UE 400 in the symbol #0 to symbol #2 of slot #n, and the DCI may contain the PRI which may indicate to the UE to transmit the HARQ feedback on a PUCCH resource in slot #n+4. The BS 320 may then transmit another DCI to the UE 400 in the symbol #0 to symbol #2 f slot #n+2 to the UE 400, and the DCI may contain the PRI which may indicate to the UE to transmit the HARQ feedback on the PUCCH resource #1 in slot #n+4, and PUCCH resource #1 may be configured to perform the PUCCH repetition based on the RRC signaling.

Since the PUCCH resource #1 may belong to PUCCH format 2, the PUCCH repetition for the PUCCH resource #1 may be an intra-slot PUCCH repetition transmission. Hence, the UE may drop the HARQ feedback which is triggered by the DCI received on the slot #n. In some of the present implementations, the two HARQ feedbacks may multiplex on the PUCCH resource #I. However, if there are independent HARQ codebooks for URLLC and Embb, it is possible that the two HARQ feedbacks may collide with each other.

In one implementation, if the PUCCH resource triggered on slot #n is associated with the spatial domain filter marked as "CRI #1" and the PUCCH resource #1 triggered on slot #2 is associated with the spatial domain filter marked as "CRI #10", the UE may not drop the PUCCH resource triggered on slot #n, because the UE may have the capability to transmit these two PUCCH from different antenna panels (e.g., the antenna panels 412 and 414) at the same time.

In one implementation, if the PUCCH resource triggered on slot #n is associated with the spatial domain filter marked as "CRI #1" and the PUCCH resource #1 triggered on slot #2 is associated with the spatial domain filter marked as "CRI #2", the UE may drop the PUCCH resource triggered on slot #n, because the two PUCCH resources may be transmitted from the same antenna panel.

In one implementation, when the BS 320 transmits another DCI to the UE 400 in the symbol #0 to symbol #2 of slot #n+2, the DCI may contain not only the PRI and K1 indicators which may indicate to the UE to transmit the HARQ feedback on the PUCCH resource #1 in slot #n+4, but also an indicator (e.g., having the value "1" may mean that the UE may transmit HARQ feedback on multiple PUCCH resources at the same time, and "0" may mean that the UE may not transmit HARQ feedback on multiple PUCCH resources at the same time if the PUCCH resource for HARQ feedback overlapped with each other) to inform the UE to perform the HARQ multiplexing with the HARQ feedback for another PDSCH. Since the indicator is "1", the UE may not multiplex the HARQ feedback for the PDSCH scheduled on the slot #n with the HARQ feedback for the PDSCH scheduled on the slot #n+2 to the PUCCH resource #1, but the UE may transmit the HARQ feedback for each PDSCH on two PUCCH resources separately (e.g., having different spatial domain filters).

In one implementation, the UE may be configured (e.g., by RRC signaling) with one indicator to activate/deactivate the HARQ multiplex if two PUCCH resources for the HARQ feedback are overlapped with each other (e.g., having the value "1" may mean that the UE may transmit the HARQ feedback on multiple PUCCH resources at the same time, and "0" may mean that the UE may not transmit the HARQ feedback on multiple PUCCH resources at the same time if PUCCH resource for HARQ feedback overlapped with each other). If the indicator is "0", the UE may multiplex the HARQ feedback for the PDSCH scheduled on the slot #n with the HARQ feedback for the PDSCH scheduled on the slot #n+2 to the PUCCH resource #1.

In some of the present implementations, the BS 320 may transmit two DCIs to the UE 400 in the symbol #0 to symbol #2 of slot #n. One of the DCIs may be transmitted on the CORESET #1 from the TRP 312 and another DCI may be transmitted on the CORESET #2 from the TRP 314, as shown in FIG. 5. The UE 400 may receive the DCI from the TRP 312 based on the spatial domain filter marked as "CRI #1" and receive the DCI from the TRP 314 based on the spatial domain filter marked as "CRI #10". Based on the configuration, the UE 400 may consider that "CRI #1" corresponds to the antenna panel 412, and "CRI #10" corresponds to antenna panel 414. Therefore, the MAC layer of the UE 400 may determine that the HARQ process ID of the DCI on CORESET #2 is "21" when the HARQ process ID of the DCI on the CORESET #2 is "5". Similarly, the MAC layer of the UE 400 may determine that the HARQ process ID of the DCI on the CORESET #1 is "5" when the HARQ process ID of the DCI on the CORESET #1 is "5". In some of the present implementations, the offset for the actual HARQ process ID may be related to the number of HARQ processes for a PDSCH/PUSCH, which in this case, the number of HARQ process for the PDSCH is 16.

In one implementation, the BS 320 may transmit two DCIs to the UE 400 in the symbol #0 to symbol #2 of slot #n. The first DCI may be transmitted on the CORESET #1 from the TRP 312 and the second DCI may be transmitted on the CORESET #2 from the TRP 314, as shown in FIG. 5. Moreover, the first DCI may indicate to the UE to transmit the HARQ feedback on the PUCCH resource with the spatial domain filter as "CRI #1", and the second DCI may indicate to the UE to transmit the HARQ feedback on the PUCCH resource with the spatial domain filter as "CRI #2". Based on the configuration, the UE 400 may consider that "CRI #1" corresponds to the antenna panel 412, and that "CRI #2" corresponds to antenna panel 414. Therefore, the MAC layer of the UE 400 may determine that the HARQ process ID of the DCI on the CORESET #1 is "5" when the HARQ process ID of the DCI on the CORESET #2 is "5". Similarly, the MAC layer of the UE 400 may determine that the HARQ process ID of the DCI on the CORESET #1 is "6" when the HARQ process ID of the DCI on the CORESET #1 is "6".

In one implementation, since the UE is configured to perform a multiple TRP in a non-ideal backhaul scenario, or the UE may be configured to receive multiple PDCCH from the different TRPs to schedule the PDSCH from each TRP separately, the UE may assume that the DCI format may be the same as DCI format 0_1 and DCI format 1_1. The BS 320 may transmit two DCIs to the UE 400 in the symbol #0 to symbol #2 of slot #n. The first DCI may be transmitted on the CORESET #1 from the TRP 312 and the second DCI may be transmitted on the CORESET #2 from the TRP 314, as shown in FIG. 5. Meanwhile, the actual HARQ process number for the MAC layer may add an offset in consideration of the different TRPs. Therefore, the MAC layer of the UE 400 may consider that the HARQ process ID of the DCI on the CORESET #2 is "21" when the HARQ process ID of the DCI on CORESET #2 is "5". Similarly, the MAC layer of the UE 400 may determine that the HARQ process ID of the DCI on the CORESET #1 is "5" when the HARQ process ID of the DCI on the CORESET #1 is "5". In some of the present implementations, the offset value for the actual HARQ process ID may be related to the number of HARQ processes for a PDSCH/PUSCH, which in this case, the number of HARQ process for the PDSCH is 16.

In one implementation, since the UE may be configured to perform multiple TRP in an ideal backhaul scenario, or the UE may be configured to receive a single PDCCH from a TRP to schedule the PDSCH from each TRP, the UE may assume that the DCI format may be different from the DCI format 0_1 and DCI format 1_1, and the HARQ process number may have the same or longer length bit-field in the DCI for a single PDCCH for a multiple TRP scenario. Alternatively, the BS 320 may transmit one DCI to the UE 400 in the symbol #0 to symbol #2 of slot #n, and the first DCI is transmitted on CORESET #1 from the TRP 312, as shown in FIG. 5. Therefore, the MAC layer of the UE 400 may determine that the HARQ process ID of the DCI on the CORESET #1 is "5" based on the HARQ process number contained in the DCI.

Figure 6:
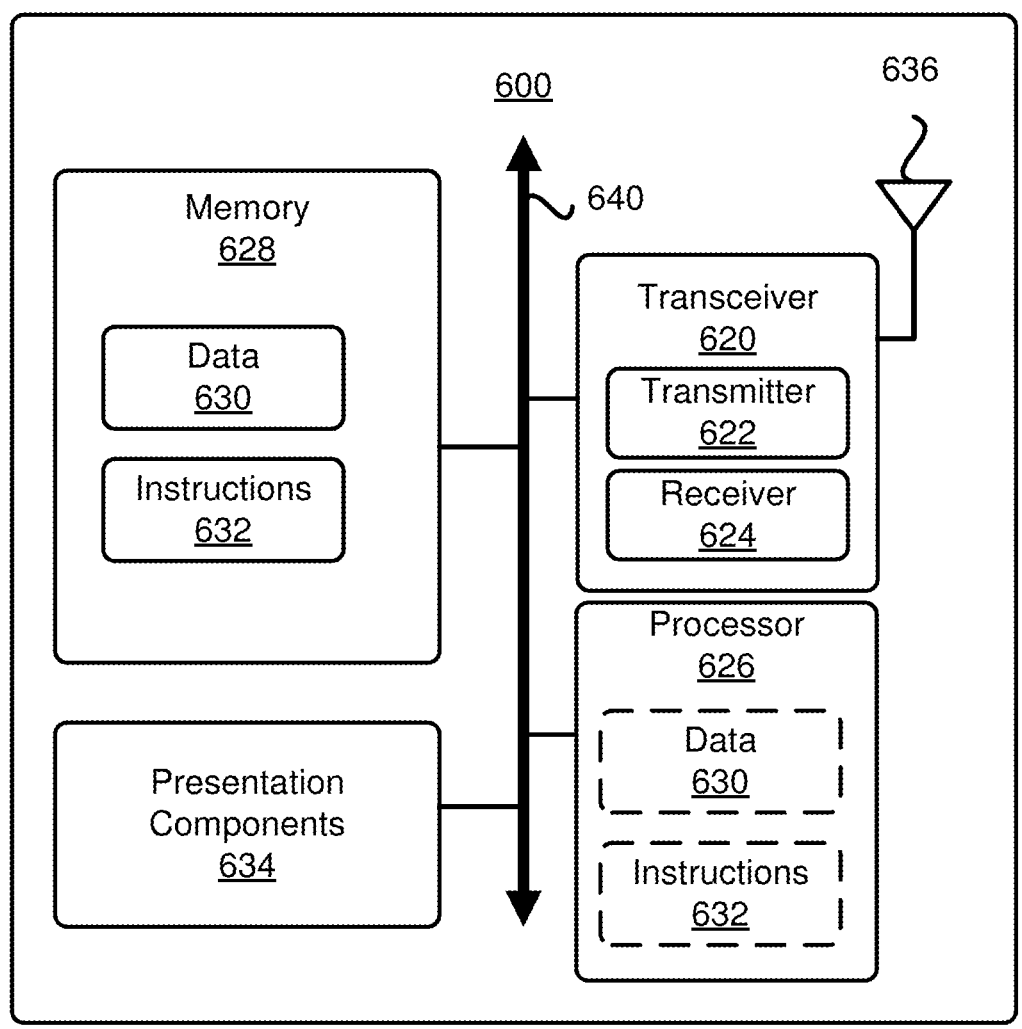
FIG. 6 illustrates a block diagram of a node for wireless communication, according to one example implementation of the present application.

FIG. 6 illustrates a block diagram of a node for wireless communication, according to one example implementation of the present application. As shown in FIG. 6, node 600 may include transceiver 620, processor 626, memory 628, one or more presentation components 634, and at least one antenna 636. Node 600 may also include a Radio Frequency (RF) spectrum band module, a base station communications module, a network communications module, and a system communications management module, input/output (I/O) ports, I/O components, and power supply (not explicitly shown in FIG. 6). Each of these components may be in communication with each other, directly or indirectly, over one or more buses 640.

Transceiver 620 having transmitter 622 and receiver 624 may be configured to transmit and/or receive time and/or frequency resource partitioning information. In some implementations, transceiver 620 may be configured to transmit in different types of subframes and slots including, but not limited to, usable, non-usable and flexibly usable subframes and slot formats. Transceiver 620 may be configured to receive data and control signalings.

Node 600 may include a variety of computer-readable media. Computer-readable media can be any available media that can be accessed by node 600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 628 may include computer-storage media in the form of volatile and/or non-volatile memory. Memory 628 may be removable, non-removable, or a combination thereof. Exemplary memory includes solid-state memory, hard drives, optical-disc drives, and etc. As illustrated in FIG. 6, memory 628 may store computer-readable, computer-executable instructions 632 (e.g., software codes) that are configured to, when executed, cause processor 626 to perform various functions described herein, for example, with reference to FIGS. 1 through 6. Alternatively, instructions 632 may not be directly executable by processor 626 but be configured to cause node 600 (e.g., when compiled and executed) to perform various functions described herein.

Processor 626 may include an intelligent hardware device, for example, a central processing unit (CPU), a microcontroller, an ASIC, and etc. Processor 626 may include memory. Processor 626 may process data 630 and instructions 632 received from memory 628, and information through transceiver 620, the base band communications module, and/or the network communications module. Processor 626 may also process information to be sent to transceiver 620 for transmission through antenna 636, to the network communications module for transmission to a core network.

One or more presentation components 634 presents data indications to a person or other device. For example, one or more presentation components 634 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of a user equipment (UE) for performing a physical uplink control channel (PUCCH) repetition, the method comprising:
   receiving, from a base station, via downlink control information (DCI) in a control resource set (CORE-SET), a PUCCH repetition indicator that indicates a number of PUCCH repetition transmissions;
   determining at least two spatial domain filters for the number of PUCCH repetition transmissions;
   transmitting, to the base station, a PUCCH in a first slot using a first spatial domain filter of the at least two spatial domain filters; and
   transmitting, to the base station, a repeat of the PUCCH in one of the first slot or a second slot different from the first slot using a second spatial domain filter of the at least two spatial domain filters,
   wherein the at least two spatial domain filters are mapped to each of the number of PUCCH repetition transmissions cyclically.

2. The method of claim 1, wherein:
   the PUCCH transmitted to the base station using the first spatial domain filter corresponds to a first transmission-reception point (TRP); and
   the repeat of the PUCCH transmitted to the base station using the second spatial domain filter corresponds to a second TRP.

3. A user equipment (UE) comprising:
   one or more non-transitory computer-readable media having computer-executable instructions for transmitting physical uplink control channel (PUCCH) repetition; and
   at least one processor coupled to the one or more non-transitory computer-readable media, and configured to execute the computer-executable instructions to cause the UE to:
      receive, from a base station, via downlink control information (DCI) in control resource set (CORE-SET) a PUCCH repetition indicator that indicates a number of PUCCH repetition transmissions;
      determine at least two spatial domain filters for the number of PUCCH transmissions;
      transmit, to the base station, a PUCCH in a first slot using a first spatial domain filter of the at least two spatial domain filters; and
      transmit, to the base station, a repeat of the PUCCH in one of the first slot or a second slot different from the first slot using a second spatial domain filter of the at least two spatial domain filters,
      wherein the at least two spatial domain filters are mapped to each of the number of PUCCH repetition transmissions cyclically.

4. The UE of claim 3, wherein:
   the PUCCH transmitted to the base station using the first spatial domain filter corresponds to a first transmission-reception point (TRP); and
   the repeat of the PUCCH transmitted to the base station using the second spatial domain filter corresponds to a second TRP.

* * * * *